(12) United States Patent
Dullin et al.

(10) Patent No.: US 7,531,772 B2
(45) Date of Patent: May 12, 2009

(54) APPARATUS FOR TRANSLATIONAL DISPLACEMENT OF A LENS IN A LASER FOCUSSING OPTICAL SYSTEM

(75) Inventors: Peter S. Dullin, Gilching (DE); Alistair Baillie Gill, Thaining (DE); John Spang, Blackburn (GB)

(73) Assignee: Raylase AG, Wessling (DE)

( * ) Notice: Subject to any disclaimer, the term of this patent is extended or adjusted under 35 U.S.C. 154(b) by 475 days.

(21) Appl. No.: 11/239,081

(22) Filed: Sep. 30, 2005

(65) Prior Publication Data

US 2007/0030547 A1    Feb. 8, 2007

(30) Foreign Application Priority Data

Oct. 19, 2004    (DE)    ........................ 10 2004 050 916

(51) Int. Cl.
*G02B 7/04*    (2006.01)
*G02B 15/14*    (2006.01)

(52) U.S. Cl. ................. 250/201.5; 250/201.4; 359/696; 359/698

(58) Field of Classification Search .............. 250/201.1, 250/201.2, 201.5; 359/196, 822–824, 698, 359/383, 684, 852; 352/140; 356/609, 624

See application file for complete search history.

(56) References Cited

U.S. PATENT DOCUMENTS

| | | | | |
|---|---|---|---|---|
| 1,620,768 | A * | 3/1927 | Joy | ............................. 352/140 |
| 4,291,958 | A * | 9/1981 | Frank et al. | .................. 396/133 |
| 4,807,966 | A * | 2/1989 | Nakayama et al. | .......... 359/824 |
| 5,306,903 | A | 4/1994 | Yamamuro et al. | |
| 5,900,995 | A * | 5/1999 | Akada et al. | ................. 359/824 |
| 6,178,051 | B1 * | 1/2001 | Tanaka | ........................ 359/698 |
| 6,751,033 | B2 | 6/2004 | Goldstein et al. | |

FOREIGN PATENT DOCUMENTS

| | | |
|---|---|---|
| DE | 1 597 417 | 4/1970 |
| DE | 203 20 269 U1 | 5/2004 |
| FR | 2 850 892 A1 | 8/2004 |

* cited by examiner

*Primary Examiner*—Georgia Y Epps
*Assistant Examiner*—Jennifer Bennett
(74) *Attorney, Agent, or Firm*—Duane Morris LLP

(57) ABSTRACT

An apparatus is described for automatically shifting a lens of a laser focussing optical system, the lens undergoing translational motion along an optical axis, being moved by at least one motor which carries out rotational movement. This rotational movement is converted by a linkage into translational movement to shift the lens.

6 Claims, 6 Drawing Sheets

APPARATUS FOR TRANSLATIONAL DISPLACEMENT OF A LENS IN A LASER FOCUSSING OPTICAL SYSTEM

BACKGROUND OF THE INVENTION

The instant invention relates to a laser focussing means and especially concerns an automatic displacement mechanism for translational motion of a lens in a laser focussing optical system.

Lasers frequently are used for scanning or machining of work-pieces. That requires the laser beam to be focussed at various points on a surface of a workpiece to be operated on. A corresponding arrangement is illustrated diagrammatically in FIG. 1. A laser beam emitted by a laser 1, first, is widened by a lens system 2, 3 in order then to be focussed again. The focussed laser beam is directed by two movable mirrors 4, 5 onto a working surface 6. The focal length of the lens system 2, 3 is designed so that the laser beam will be focussed at a desired point on the working surface 6. By varying the angle of adjustment of the mirrors 4 and 5, the laser beam can be directed at different points on the working surface 6. That, however, inherently changes the length of the optical path between the lens system 2, 3 and the incident point of the laser beam on the working surface 6. For the laser beam to become focussed again on the working surface, the focal length of the lens system 2, 3 must be adjusted accordingly. That is achieved by shifting a lens 2 along the optical axis of the laser system.

It is known in the art to accomplish such displacement of the lens 2, for instance, by linear motors or a galvanometer scanner whose rotational movement is converted into linear movement by means of a flat band spring arrangement.

However, because of the nature of the adjusting mechanism, these means of dislocating the lens are rather slow and, therefore, not useful for the faster scanning speeds which adjustable mirrors would allow easily. Moreover, it would be desirable to know the precise position of the displaceable lens. That, however, cannot be determined by the known systems, or at least not satisfactorily.

SUMMARY OF THE INVENTION

Thus it is an object of the invention to provide an apparatus for translational shifting of a lens in a laser focussing optical system which apparatus permits the lens to be displaced with precision and high speed.

This object is met, in accordance with the invention, by an apparatus for automatically shifting a lens in the embodiments described below.

The apparatus for automatically shifting a lens in a laser focussing optical system allows the lens to be displaced in a direction of translation along the optical axis. The lens is moved by at least one motor carrying out rotational movement. This rotational movement is converted into translational movement by means of a linkage so as to displace a carriage on which the lens is mounted.

In a preferred embodiment, the linkage comprises at least two rods, including at least one joint, for converting the rotational motion into translational motion.

The carriage, preferably, is supported by a roller type bearing, especially a ball bearing. In this manner the carriage or lens can be moved easily and without jerking.

The linkage may engage the carriage laterally for shifting it. The carriage is supported in a guide system so as to be able to carry out the translational movement, while the angular orientation of the lens with respect to the optical axis is maintained.

In a preferred embodiment, the lens is displaced by means of at least two motors, each having its own linkage. That makes shifting of the lens more uniform. Any tilting of the carriage in a guide system thus is prevented.

Preferably, the motors are arranged at respective opposite sides of the carriage and the linkages engage the carriage at two opposed locations. The motors are driven synchronously, i.e. at the same number of revolutions, to displace the lens or carriage.

When shifting the lens, the two motors preferably contribute the same torque. In this manner the carriage is driven by equal forces at both sides, whereby tilting of the carriage in its guide means is prevented.

In a preferred embodiment, stepping motors may be used as drive means. They allow precise approaching of the desired position in translational direction. A stepping motor may be employed in particular in an embodiment comprising but one motor. In another embodiment, galvanometers may serve as motors. They permit especially fast displacement of the lens.

According to another aspect of the invention, a means is provided for determining the position of the lens along the direction of translational motion. The means described below for determining the lens position constitutes an independent aspect of the invention and, if desired, may be used also with lens displacing means other than those described above.

The position may be determined indirectly from the angle of rotation of one of the motors. Alternatively, in an embodiment comprising two motors, the angles of rotation of both motors may be drawn upon for determining the position, such as by calculating the arithmetic mean of both angles of rotation. Conversion of the angle of rotation into the position of the lens along a direction of translation is obtained, for instance, by means of the cosine of the angle of rotation multiplied by the radial distance between the axis of rotation of the motor and the support of a connecting rod on the motor, e.g. on a crank.

In an alternative embodiment, the position of the lens also may be determined directly. That is accomplished, for example, by an assembly comprising a light source, especially a light emitting diode, and a light detector, especially a photodiode, this assembly being rigidly disposed on the adjusting mechanism of the lens. A cover which moves along together with the lens enters into an optical path between the light source and the light detector when the lens is shifted. Hereby, the light intensity measured at the light detector, preferably embodied by an areal type light detector, varies in dependence on the position of the lens. The position of the lens can be derived from the light intensity. The function between the light intensity and the lens position, for instance, may be linear and generally depends on the geometry of the cover as well as the light detector and the light source.

In a preferred embodiment, two means are provided for determining the lens position, each comprising a light source, a light detector, and a cover disposed on the lens. The pairs of light sources and light detectors or the covers may be arranged such that shifting of the lens will cause one cover to move into the optical path of the first pair consisting of the first light source and the first light detector, while the second cover, at the same time, is displaced out of the optical path of the second light source and the second light detector. The light intensities measured at the two light detectors are opposed to each other, yet add up to the same sum, irrespective of the lens position. The position of the lens is determined from the ratio of the two light intensities measured. Applying suitable control electronics, this method of measuring makes it possible to compensate non-linearities or variations in intensity of the light source as well as non-linearities or variations in the sensitivity of the light detector. For this reason the measuring system which comprises two light sources and two light detectors is more precise.

The cover, for example, may have the shape of a rectangle, a triangle, and it may be an isosceles triangle or a trapeze, especially in the case of the embodiment with two light sources and two light detectors.

BRIEF DESCRIPTION OF THE FIGURES

Further features and advantages of the invention will become apparent from the embodiments of the invention described below with reference to the accompanying drawings, in which.

DETAILED DESCRIPTION

Figure 2:
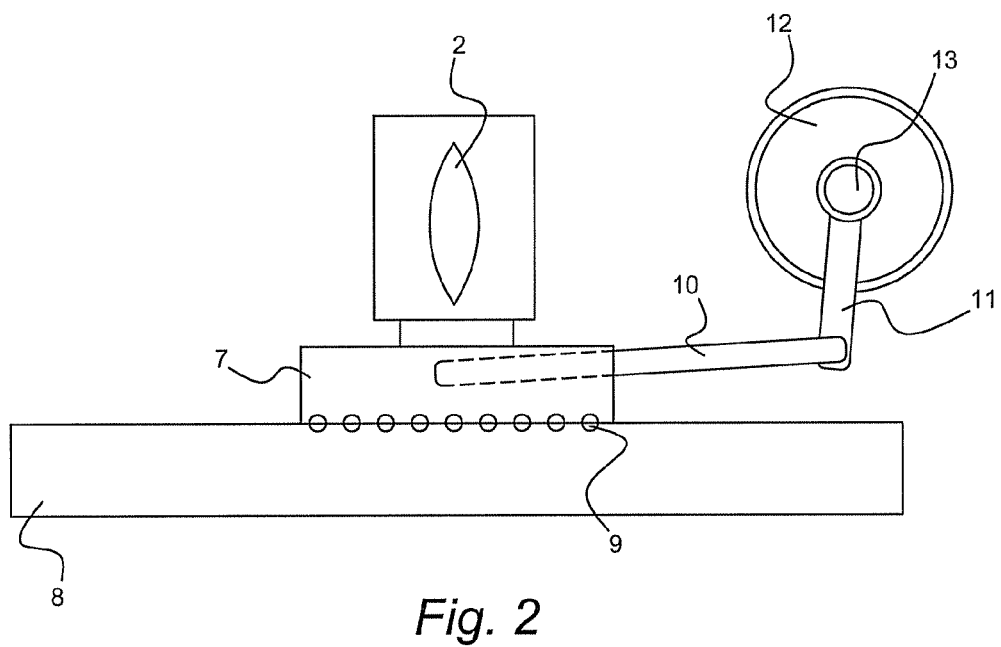
FIG. 2 illustrates a lens shifting means according to a first embodiment of the invention.
Figure 3:
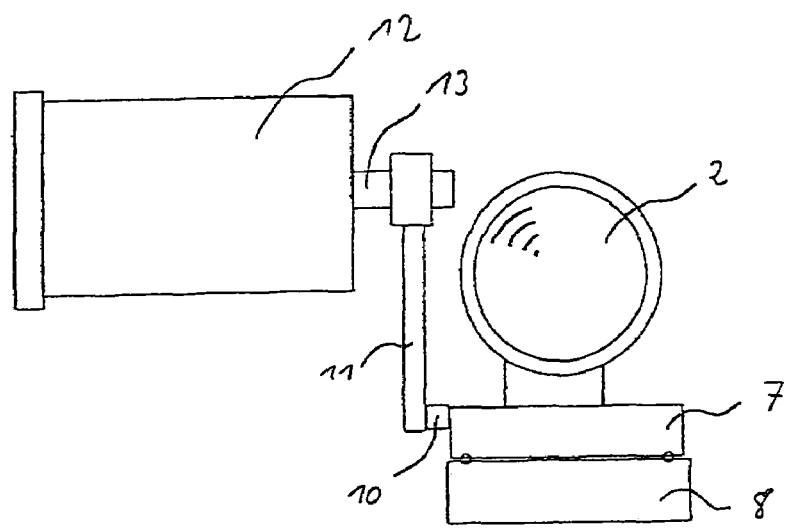
FIG. 3 illustrates a lens shifting means according to FIG. 2, yet from a different perspective.

FIGS. 2 and 3 show an embodiment of a lens shifting mechanism according to the instant invention. A lens 2 is mounted on a displaceable carriage 7. The carriage 7 can carry out translational movement along a guide means 8. A ball bearing means 9 preferably is provided between the guide means 8 and the carriage 7 so as to diminish frictional forces. The carriage is moved by a linkage 10, 11 which is driven by a motor 12. To this end, one end of rod 11 is firmly attached to an axis of rotation 13 of the motor 12. The movement of the rod 11 resulting from rotation of the motor 12 is transmitted to the rod 10 by a diverting mechanism. The rod 10 in turn is connected to the carriage 7 so as to set it into translational motion when the linkage 10, 11 is driven by way of the axis of rotation 13.

Figure 1:
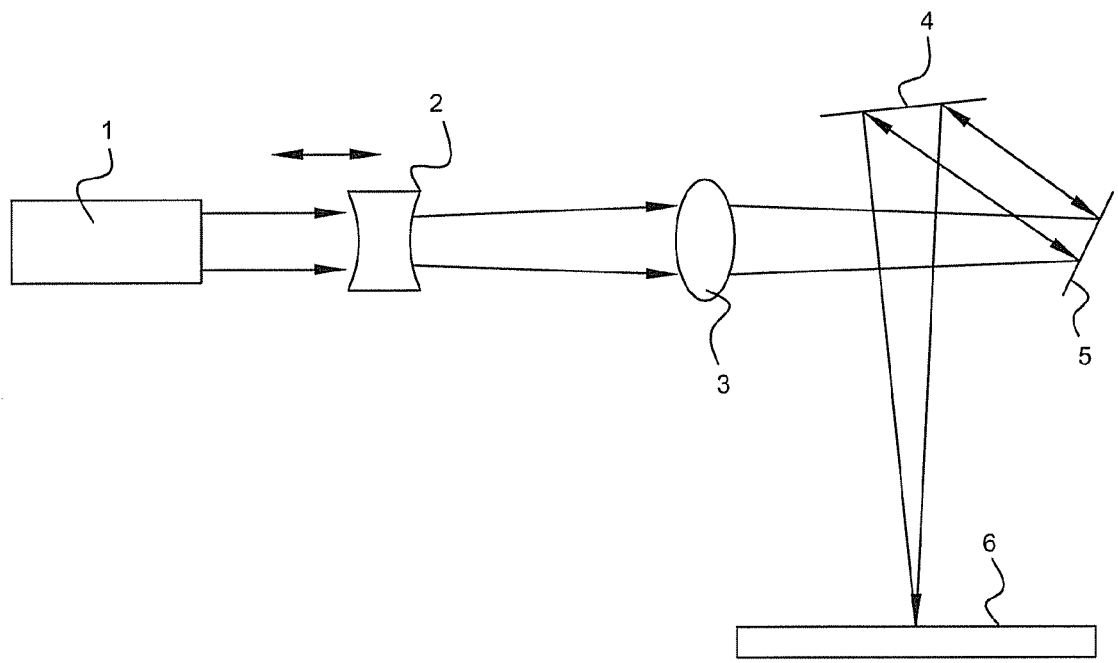
FIG. 1 illustrates a laser assembly comprising a laser focussing optical system and a beam deflection means.

In the embodiments illustrated, the displaceable lens 2 is shown to be a converging lens. However, as may be taken from FIG. 1, a convex lens may be used instead.

Figure 4:
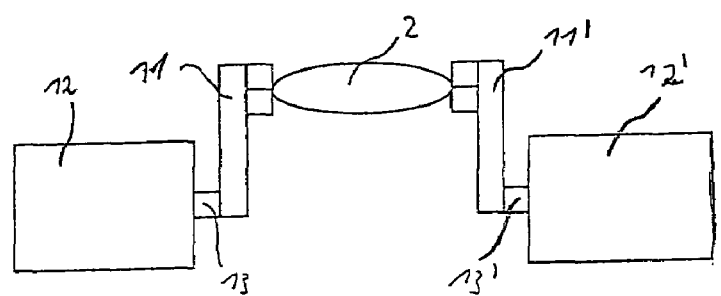
FIG. 4 illustrates another embodiment of the lens shifting means according to the invention, comprising two motors.

FIG. 4 shows another embodiment of a lens adjusting mechanism of the instant invention for translational displacement of the lens 2 along an optical axis which extends in vertical direction in the presentation of FIG. 4. A motor 12, 12' each is associated with each side of the lens 2. The motors 12, 12', for example, are galvanometer motors. Rotational motion of the motors (in FIG. 4 the axis of rotation 13, 13' extends in horizontal direction) is converted into pure translational motion by respective linkages 11, 11'.

Both motors 12, 12' are rotated in synchronism for shifting of the lens 2. The linkages 11, 11' convert the rotational motion into translational motion and the latter is transmitted to the lens or to a carriage (not shown in FIG. 4) on which the lens is mounted. The translational position of the lens can be determined from the angle of rotation of the motors. To accomplish that, one of the motors 12, 12' comprises a means which emits a signal indicating the angle of rotation of the motor. The position of the lens along the optical axis can be determined by approximation, for instance, from the relationship $$a \approx r \cos \phi$$

wherein a is the position of the lens along the optical axis, r is the radial distance of the end of the linkage 11 or 11' facing the motor from the axis of rotation of the motor 12 or 12', respectively, and $\phi$ is the angle of rotation of the motor. In the embodiment shown, the maximum angle of rotation carried out by the motors is about 10° to 20°.

The exact position of the displaceable lens can be calculated, for instance, by evaluation electronics which may be computer aided.

With this embodiment, the two motors rotate in the same sense and at the same rotational speed for shifting the lens. The motors, furthermore, provide the same amount of torque so that like forces are applied to both sides of the carriage. Thereby, tilting of the carriage in the guide means is prevented.

Figure 5:
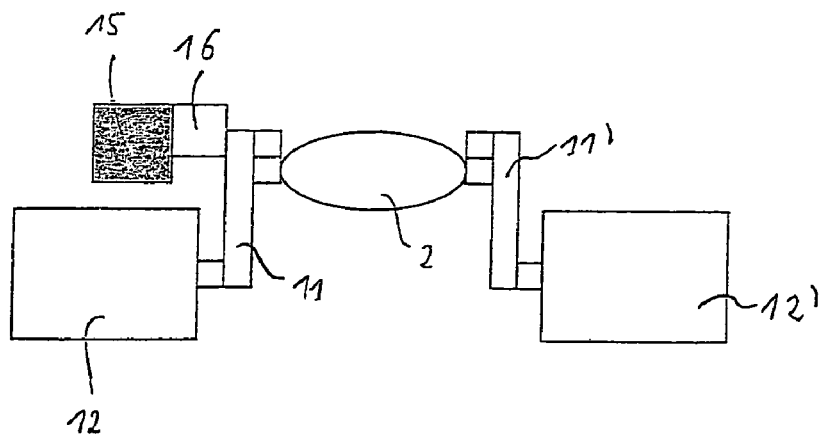
FIG. 5 illustrates the lens shifting means shown in FIG. 4, yet with an additional means for determining the position of the displaceable lens.

FIG. 5 shows an alternative embodiment of an apparatus for translational positioning of a lens. This embodiment differs from the one shown in FIG. 4 by the kind of means used for determining the position of the lens. In contrast to FIG. 4, the position of the lens is not determined indirectly from the angle of rotation of the motors but instead is measured directly at the lens. To that end not only a cover or flag 16 is provided on the lens 2 or carriage as well as an areal light emitting diode 15 and an areal photodiode 14 (the latter covered in the presentation of FIG. 5) are provided.

Figure 6:
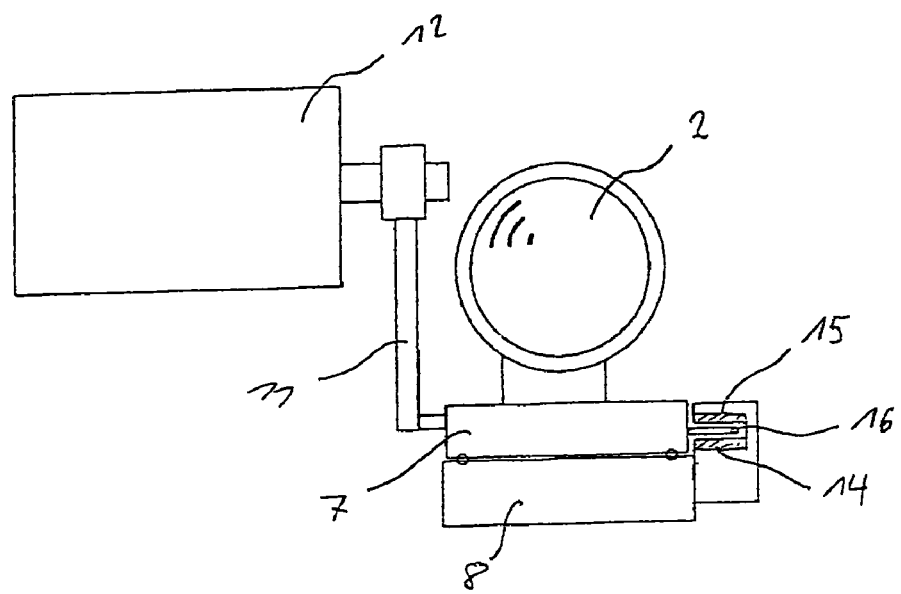
FIG. 6 illustrates an embodiment of the invention, comprising a drive motor and a means for determining the position of the lens.

The same mechanism for determining the position of the lens is shown in FIG. 6, yet the perspective is rotated through 90° and this embodiment of the invention includes only one drive motor. A cover disc 16 is firmly connected to the lens or carriage and thus accompanies translational motions of the lens. A pair consisting of a light emitting diode 15 and a photodetector 14 which cooperate in the manner of a light barrier are provided above and below the cover 16, respectively. The cover disc 16 is dimensioned and mounted on the lens 2 such that, with the lens 2 in one position, the optical connection between the light emitting diode 15 and the photodetector 14 is fully covered, whereas the optical connection between the light emitting diode 15 and the photodetector 14 is completely exposed when the lens is in the other extreme position. Accordingly, the optical connection is partly covered when the lens is in an intermediate position. The position of the cover disc 16 and thus the position of the lens 2 or carriage can be determined based on the light intensity measured at the photodetector 14. The relationship between the intensity measured and the position of the lens along the optical axis may be linear, for example, depending on the geometry of the cover disc, the light emitting diode 15 and the photodetector 14. Thus the position of the lens can be determined precisely by use of an electronic evaluation means (not shown). It is advantageous, with this kind of positional determination, that the position of the lens is measured directly. An error in lens positioning which might be caused, for instance, by clearance in the linkage 10, 11 of the lens 2 does not affect the measurement in view of the fact that the position of the lens 2 or its cover disc 16 is determined directly. This design has the advantage that all movable components are included in the control loop, whereby linearity of the measuring system is ensured. However, any nonlinearity occurring with the measuring process which utilizes the angle of rotation of the motor likewise can be compensated according to the invention, either by adequate electronic circuitry or via software.

Figure 7:
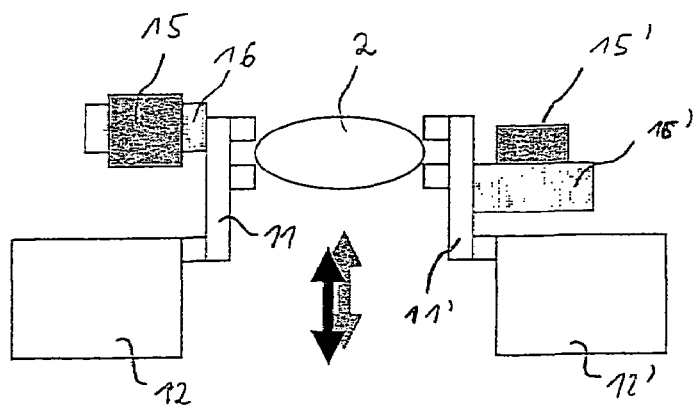
FIG. 7 illustrates another embodiment of an apparatus for shifting the lens, comprising a two-part means for determining the lens position in accordance with another embodiment of the invention.

FIG. 7 illustrates a lens shifting apparatus with an alternative embodiment of the means for determining the lens position. In this embodiment, two units, each consisting of a light emitting diode and a photodetector and respective cover discs, are provided at either side of the lens 2 or carriage. Yet the configuration and the locations of the cover discs 16 and 16' are selected such that the coverage of the light barrier of the one pair consisting of light emitting diode 15 and the photodetector increases upon translational motion of the lens 2, while the coverage of the light barrier between the light emitting diode 15' and the corresponding photodetector at the opposite side decreases. These relationships become the exact opposite when the lens is moved in opposite direction. Consequently, the sum of the two light intensities measured at the two photodetectors remains constant, and the position of the lens or cover discs can be determined accurately from the ratio of the signals. Since noise can be minimized by means of the sum signal, the lens position may be determined more precisely from the signal ratio.

Figure 8:
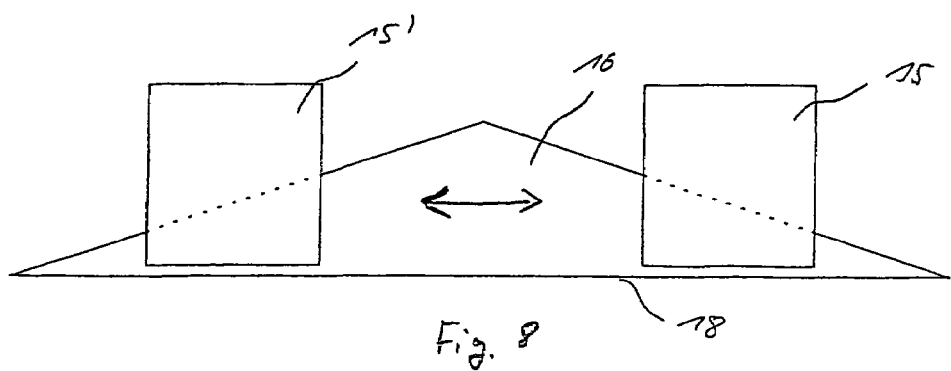
FIGS. 8 to 13 illustrate various embodiments of optical means for determining the position of a displaceable lens in accordance with embodiments of the invention.
Figure 9:
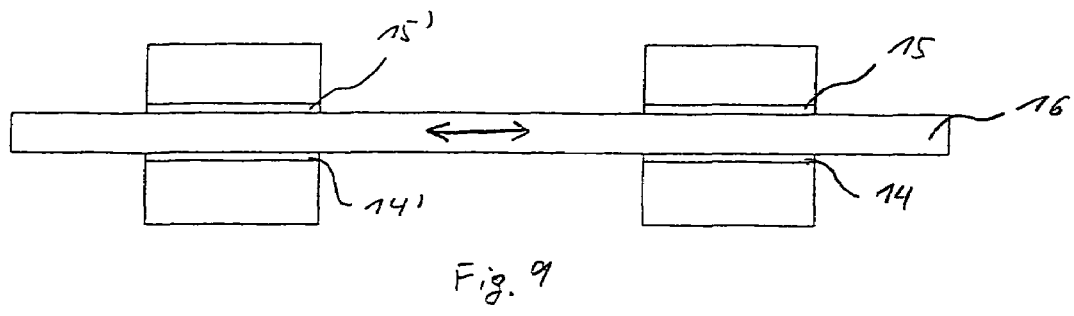

FIGS. 8 and 9 illustrate another embodiment of the means for determining the position of the lens or carriage. For the sake of clarity of the drawing, only the cover disc and the pairs consisting of light emitting diode and photodetector are shown. The cover disc 16 is shaped like an isosceles triangle. It is mounted on the carriage of the displaceable lens so as to move in parallel with the base 18 of the isosceles triangle (in FIGS. 8 and 9 the double arrow indicates the directions of displacement). The two pairs of light emitting diodes 15, 15' and photodetectors 14, 14' are mounted in such a way as to be movable along. Upon shifting of the lens or carriage, the extent of coverage of the one light barrier 14, 15 by the triangular cover 16 is increased, while the coverage of the other light barrier 14', 15' is diminished at the same time. The intensities measured at the two photodetectors are evaluated in the same fashion as described with reference to FIG. 7.

Figure 10:
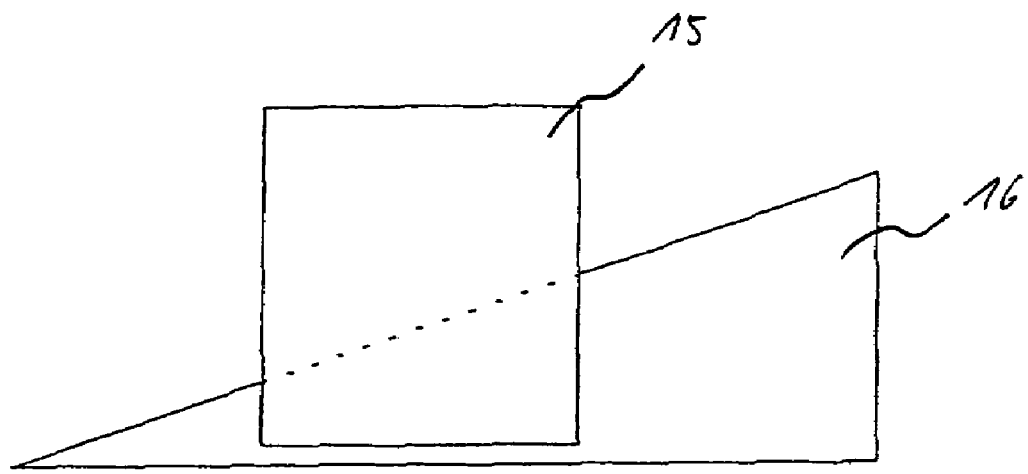
Figure 11:
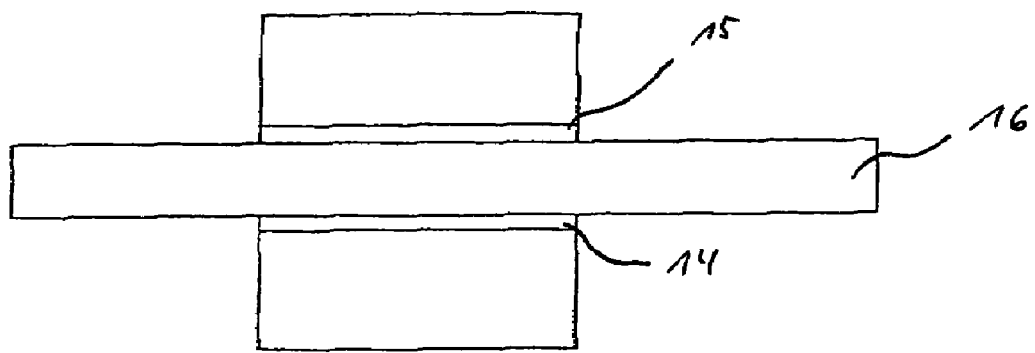
Figure 12:
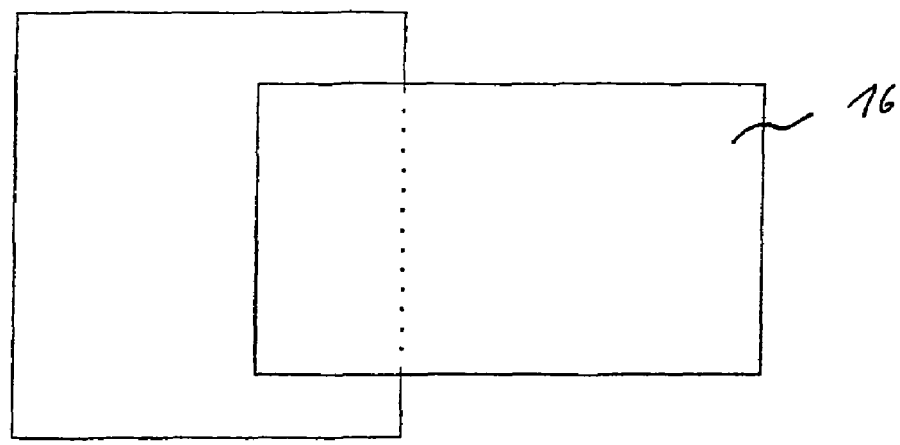
Figure 13:
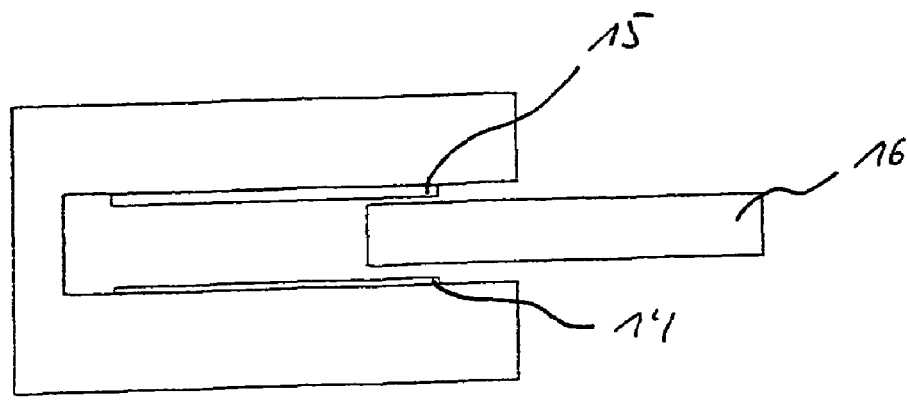

FIGS. 10 to 13 show embodiments of how to determine the position by means of only a single respective light barrier. In FIGS. 10 and 11 the cover is shaped like a triangle, whereas FIGS. 12 and 13 show an embodiment with a cover disc in the form of a rectangle. FIGS. 10 and 12 each are top plan views of the light barrier and FIGS. 11 and 13 are side elevational views of the respective embodiment.

Use of a cover disc of triangular shape is especially advantageous with light sources or light detectors which emit and detect light, respectively, across a small surface area only. When using a triangular cover disc, variation of the position of the cover disc causes the light barrier to become covered only slowly so that the light intensity transmitted still can be measured, even when basic surface of the light detector or light source is small.

Deviations from linearity of the light source and/or light detector between the light intensity emitted and the light intensity detected as compared to the light emitting surface and the irradiated surface, respectively, can be compensated by a cover disc which is shaped accordingly. For example, the cover disc may have the basic surface of a triangle, the inclined edge which is slid into the light barrier being curved either inwardly or outwardly. In this manner such non-linearities can be compensated.

The embodiments described here of the lens shifting means and of the determination of the lens position have been chosen merely as examples to explain the invention. Many variations and modifications may be made without leaving the scope of protection as defined by the claims. All of the systems described possess the advantages of having a simple structure as compared to the state of the art, of being easy to adjust, durable, robust and fast.

The invention claimed is:

1. An apparatus for automatically shifting a lens of a laser focusing optical system, the lens carrying out translational movement along an optical axis, comprising:
   at least one motor;
   at least one linkage;
   a carriage; and
   a means for determining the position of the lens along the direction of translational motion by means of an optical signal,
   wherein the lens is moved by the at least one motor which carries out rotational movement, the rotational movement being converted by the at least one linkage into translational movement to displace the carriage on which the lens is mounted,
   wherein the means for determining the position of the lens comprises at least two light sources, and at least two light detectors, all being arranged rigidly with respect to the movable lens and further comprises at least one cover moving together with the lens and entering into an optical path between the light sources and the light detectors when the lens is being shifted, and
   wherein the at least one cover is arranged with respect to the light sources and the light detectors such that shifting of the lens in one direction will displace a first part of the cover into a first optical path between a first light source and a first light detector, whereas a second part of the cover becomes displaced out of a second optical path between a second light source and a second light detector, the lens position being determined based on the ratio of the light intensities measured by the first and second light detectors.

2. The apparatus as claimed in claim 1, wherein the cover has at least one edge which is inclined with respect to a field scanned by at least one of said light detectors.

3. The apparatus as claimed in claim 1, wherein the surface of the cover is a triangle.

4. The apparatus as claimed in claim 1, wherein the surface of the cover is an isosceles triangle.

5. The apparatus as claimed in claim 1, wherein the surface of the cover is a trapeze.

6. An apparatus for automatically shifting a lens of a laser focusing optical system, the lens carrying out translational movement along an optical axis, comprising:
   at least one motor;
   at least one linkage;
   a carriage; and
   a means for determining the position of the lens along the direction of translational motion by means of an optical signal,
   wherein the lens is moved by the at least one motor which carries out rotational movement, the rotational movement being converted by the at least one linkage into translational movement to displace the carriage on which the lens is mounted,
   wherein the means for determining the position of the lens comprises at least one light source, and at least one light detector, both being arranged rigidly with respect to the movable lens and further comprises at least one cover moving together with the lens and entering into an optical path between the light source and the light detector when the lens is being shifted, the lens position being determined based on the light intensity measured by the light detector, wherein said at least one cover has a curved edge which moves into the optical path between the light source and the light detector when the lens is being shifted, and wherein the curvature of the edge is such that any deviations from linearity of the sensitivity of the light detector with respect to an irradiated detection surface of the light detector and/or deviations from linearity of the light intensity emitted by the light source with respect to a light emitting output surface of the light source will be compensated.

* * * * *